United States Patent [19]

Shaw et al.

[11] Patent Number: 5,241,313
[45] Date of Patent: Aug. 31, 1993

[54] ANGLE-OF-ARRIVAL MEASUREMENT VIA TIME DOPPLER SHIFT

[75] Inventors: Rudy L. Shaw, Huber Heights; Nicholas A. Pequignot, Kettering, both of Ohio

[73] Assignee: The United States of America as represented by the Secretary of the Air Force, Washington, D.C.

[21] Appl. No.: 940,153

[22] Filed: Sep. 3, 1992

[51] Int. Cl.$^5$ .................................................. G01S 13/50
[52] U.S. Cl. ........................................ 342/13; 342/387
[58] Field of Search ................. 342/13, 387, 417, 450, 342/451

[56] References Cited

U.S. PATENT DOCUMENTS

| | | | |
|---|---|---|---|
| 3,866,229 | 2/1975 | Hammack | 342/451 |
| 4,008,470 | 2/1977 | Lanning et al. | 342/13 X |
| 4,172,255 | 10/1979 | Barrick et al. | 343/5 W |
| 4,393,382 | 7/1983 | Jones | 342/13 X |
| 4,549,184 | 10/1985 | Boles et al. | 342/11 R |
| 4,746,924 | 5/1988 | Lightfoot | 342/453 |
| 4,825,213 | 4/1989 | Smrek | 342/25 |

Primary Examiner—T. H. Tubbesing
Attorney, Agent, or Firm—Bernard E. Franz; Thomas L. Kundert

[57] ABSTRACT

To allow measurement of the angle-of-arrival (AOA) of the radar pulses from an uncooperative ground-based emitter, the method exploits the time doppler shift resulting from the velocity of a high performance aircraft and the high maneuver ability available to such aircraft to form initial angle calculations. These initial angle calculations along with inherent radar stability are then used for subsequent AOA measurements. The aircraft is flown at a constant velocity $V_B$ along successive legs with an angle $\phi_K$ between successive legs, and the velocity $V_B$ and the angles $\phi_K$ are found using a navigation system such as GPS or inertial navigation. The time difference $T_n' - T_1'$ is measured between the arrival of the first and last of n pulses for each sample. A general approximation equation of $T_n' - T_1'$ is normalized such that for any K samples the following equation applies,

$$e_K = R(1 - s \cos \phi_K)1$$

wherein $\theta_K$ is the angle from the line of flight for a leg K to the emitter, where $e_K = (T'_n - T'_1)/(n-1)$, $s = V_B/c(n-1)$, c is the velocity of light, and $R = e_K/(1 - s \cos \theta_2)$. The value of the angle $\theta_K$ is calculated using the following equation.

$$e_2 - e_1 = s [e_2{}^2 - 2e_1 e_2 \cos\phi + e_1{}^2]^{\frac{1}{2}} \sin\left(\theta_2 + \left(\arcsin \frac{p}{r}\right)\right)$$

where
 $p = -e_1 + e_2 \cos\phi$
 $r = (e_2{}^2 - 2e_1 e_2 \cos\phi + e_2{}^2)^{\frac{1}{2}}$.

1 Claim, 3 Drawing Sheets

ANGLE-OF-ARRIVAL MEASUREMENT VIA TIME DOPPLER SHIFT

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a method of measuring the angle of arrival (AOA) of radar pulses from a ground-based emitter via doppler shift.

There are many methods employed to measure an uncooperative radar's AOA ranging from widely spaced receivers (i.e., multiple aircraft) to single aircraft approaches. Since this invention is for a single aircraft application the following discussion will be limited to only single aircfaft approaches. One method employs multiple antennas and measures angle via power difference among antennas. This method requires multiple antennas and multiple receivers and accuracies available are usually limited to plus or minus 15 degrees. Another method employs closely spaced multiple antenna elements where phase differences between an incoming pulse are measured and angles estimated. This method will allow accurate angle measurement (in the order of plus or minus 1 degree) however, it also requires a considerable amount of hardware for implementation.

The following United States patents are of interest.
U.S. Pat. No. 4,825,213—Smrek
U.S. Pat. No. 4,746,924—Lightfoot
U.S. Pat. No. 4,549,184—Boles et al
U.S. Pat. No. 4,172,255—Barrick et al The above patents relate to apparatus and methods for detecting and tracking targets. In particular, the Smerk patent describes a radar system and technique for use in detecting and tracking targets. Return radar signals are doppler processed, phase shifted and compared in a manner which preserves the angle of arrival of a moving target irrespective of the boresight direction. Stationary target return signals are constructively combined so as to augment the target signal gain independent of the antenna boresight direction.

The Lightfoot patent is directed to apparatus and methods for locating a target relative to a receiver aircraft utilizing electromagnetic emissions. The receiver aircraft includes a pair of ring tip synchronized scanning interferometer antennas for receiving non-reflected emissions from the target to determine the range from the receiver aircraft to the target. Other variables are calculated for locating and displaying the position of the target on a display in the receiver aircraft. To generate bearing information, the signals are received by a receiver aircraft lens antenna and split into a number of separate beams which are scanned at separate parts of the lens antenna in a predetermined manner. The bearing of the target is determined by comparing the amplitudes of the reflected signals received at lens ports.

The Boles et al patent relates to a method and apparatus for moving target ordnance control. The azimuth angle of a moving target having a radial component of velocity relative to the electrical boresight of an interferometer antenna is determined by first measuring the radial component of velocity relative of the moving target. The observed net doppler frequency of the moving target is then shifted by a fixed quantity so that the moving target resides in a doppler cell whose frequency corresponds to that of clutter in the immediate vicinity of the moving target. By plotting observable data, the azimuth angle relative to the electrical boresight of the antenna can be obtained. The azimuth angle is then used for relative range and azimuth angle weapon guidance.

The Barrick et al patent describes a system for radar remote sensing of near surface ocean currents in a coastal regions. The system comprises a pair of radar units to scatter signals from the shore off to the ocean waves. Underlying surface currents impart a slight change in velocity to the ocean waves, which is detected by the radar units. Each radar unit can determine the angular direction of arrival of the radar echo signals by comparing the phase of the signals received at three short antennas on the shore. Signals scattered from the same point on the ocean by each of the two geographically separated radar units are used to construct a complete current vector for that point.

Although the prior art patents relate to tracking targets, they do not describe a method of exploiting the time doppler shift resulting from the relative velocity of the tracking system and the target to obtain a mathematical relationship to which an angle approximation technique is applied to obtain the angle of arrival of the radar pulses.

SUMMARY OF THE INVENTION

An objective of the invention is to provide a method to be deployed on a high performance aircraft to allow measurement of the angle-of-arrival (AOA) of the radar pulses from an uncooperative ground-based emitter.

The method according to the invention exploits the time doppler shift resulting from the velocity of the high performance aircraft and the high maneuver ability available to such aircraft to form initial angle calculations. These initial angle calculations along with inherent radar stability are then used for subsequent AOA measurements.

ADVANTAGES AND NEW FEATURES: The potential exists for getting a relatively accurate angle measurement on a transmitter by exploiting the time doppler shift. This can be accomplished with less hardware than other approaches.

DETAILED DESCRIPTION

In order to understand this invention some familiarity with time doppler shift must be established. In the following analysis, the emitter is a ground based radar and the receiver is an airborne collector utilizing an omnidirectional antenna.

Figure 1:
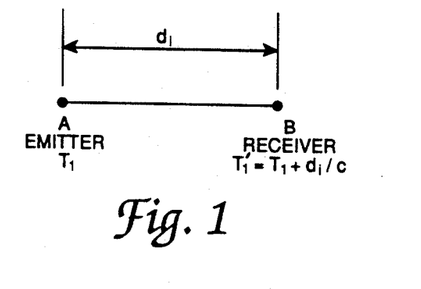
FIG. 1 is a diagram showing the relationship of a stationary emitter and a receiver.

TIME DOPPLER SHIFT: First consider the situation shown in FIG. 1, where an emitter is at point A, a receiver at point B, the distance between A and B is $d_i$, and A and B are stationary. A pulse transmitted from A at time $T_1$ will arrive at B at time $T_1'$, where $T_1' = T_1 + d_i/c$, where c = velocity of light. Similarly a pulse transmitted from A at time $T_2$ will arrive at B at $T_2'$ where $T_2' = T_2 + d_i/c$. Now consider the time difference shown in equation (1).

$$T_2 - T_1 = T_2 + \frac{d_i}{c} - T_1 - \frac{d_i}{c} = T_2 - T_1 \tag{1}$$

In this case the time difference of arrival at the receiver is the same as the time difference of transmission at the transmitter.

Figure 2:
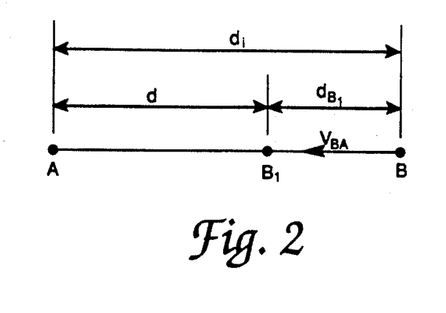
FIG. 2 is a diagram showing the relationship of a stationary emitter, and a receiver in motion directly toward the emitter.

FIG. 2. Now consider relative motion between the emitter and receiver as shown in FIG. 2. Specifically consider the case where A is stationary and B is travelling toward A with constant velocity $V_{BA}$ meters/sec. Assume initially that A and B are $d_i$ meters apart at time $T_1$ and at time $T_1$ a pulse is transmitted from A. This pulse will arrive at the receiver when the receiver is at location $B_1$. The time of arrival then is $T_1' = T_1 + d/c$ where d is the distance between A and $B_1$. Consider the derivation shown below:

$$d = d_i - d_{B1}$$
but
$$d_{B1} = [T_1' - T_1] V_{BA}$$
then
$$d = d_i - V_{BA}T_1' + V_{BA}T_1$$
and
$$T_1' = T_1 + \frac{d_i - V_{BA}T_1' + V_{BA}T_1}{c}$$
or
$$T_1' = T_1 + \frac{d_i}{c + V_{BA}}$$

In general, any pulse transmitted at time $T_o$ when the transmitter and receiver are $d_i$ units apart will arrive at the receiver at time $T_o'$ shown in equation (2).

$$T_o' = T_o + \frac{d_i}{c + V_{BA}} \tag{2}$$

Figure 3:
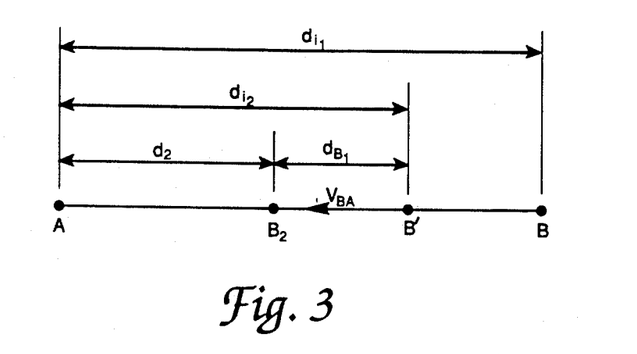
FIG. 3 is a diagram showing the relationship of a stationary emitter, and a receiver in motion directly toward the emitter, with a sequence of pulses.

FIG. 3. However, A and B are always moving toward each other and $d_i$ is continuously changing. Therefore, the relationships shown in equations (3) and FIG. 3 apply.

$$T_1' = T_1 + \frac{d_{i1}}{c + V_{BA}} \text{ and } T_2' = T_2 + \frac{d_{i2}}{c + V_{BA}} \tag{3}$$

where
$d_{i1}$ = distance between A and B at time $T_1$
$d_{i2}$ = distance between A and B' at time $T_2$ Using the relationship shown in equation (4), the time of arrival difference, $T_2' - T_1'$ can be derived as shown in equation (5).

$$d_{i2} = d_{i1} - V_{BA}[T_2 - T_1] \tag{4}$$

$$T_2' - T_1' = [T_2 - T_1]\left[1 - \frac{V_{BA}}{c + V_{BA}}\right] \tag{5}$$

Under the previous assumptions and for $V_{BA} << c$ the general case is shown in equation (6).

$$T_n' - T_1' \approx [T_n - T_1]\left[1 - \frac{V_{BA}}{c}\right] \tag{6}$$

Figure 4:
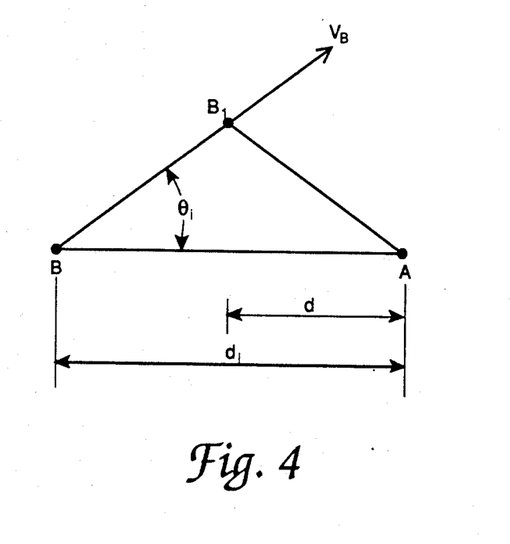
FIG. 4 is a diagram showing the relationship of a stationary emitter, and a receiver in motion.

FIG. 4. Now consider the situation where the transmitter is stationary and the receiver is moving with a constant velocity, $V_B$, but at some angle $\theta_i$ relative to A. This situation is shown in FIG. 4. In this situation, a pulse transmitted at time $T_1$ when the receiver is at point B will arrive at the receiver when the receiver is at location $B_1$. In this case the approximation shown below is valid as long as $d_i$ is long in comparison to the distance B to $B_1$ and the derivation is shown in equation (7).

$$T_1' \approx T_1 + \frac{d}{c} \tag{7}$$

$$d \approx d_i - V_B(T_1' - T_1) \cos \theta_i$$

then $$T_1' \approx T_1 + \frac{d_i}{(c + V_B \cos \theta_i)}$$

In general, any pulse transmitted at time T when the transmitter and receiver are $d_i$ units apart will arrive at the receiver at time T' shown in equation (8).

$$T' \approx T + \frac{d_i}{(c + V_B \cos \theta_i)} \tag{8}$$

Figure 5:
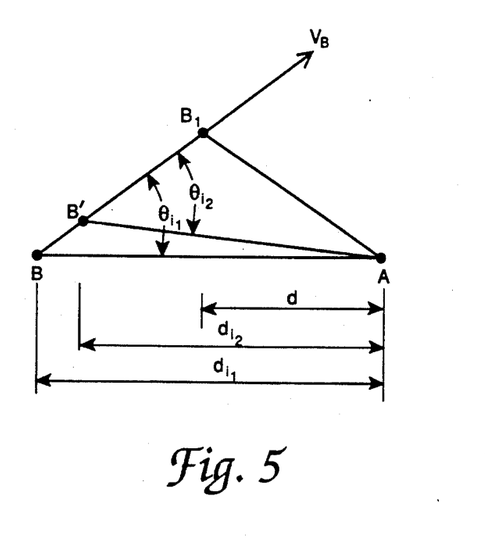
FIG. 5 is a diagram showing the relationship of a stationary emitter, and a receiver in motion, with a sequence of pulses.

FIG. 5. Now again consider a sequence of pulses where the first pulse is transmitted at time $T_1$ when the receiver is at location B and the second pulse is transmitted at time $T_2$ when the receiver is at B'. Also assume that the receiver has not changed its trajectory or its velocity. This is shown in FIG. 5. In this case, the relations shown in equation (9) hold.

$$T_1' \approx T_1 + \frac{d_{i1}}{c + V_B \cos \theta_{i1}} \tag{9}$$

and $$T_2' \approx T_2 + \frac{d_{i2}}{c + V_B \cos \theta_{i2}}$$

Now assuming the approximations shown in equations (10a), (10b) and (10c), the time difference of arrival, $T_2' - T_1'$, can be determined from equation (11).

Assume $\theta_{i2} \approx \theta_{i1}$ \hfill (10a)
$d_{i2} \approx d_{i1} - (T_2 - T_1) V_B \cos \theta_{i1}$ \hfill (10b)
$c >> V_B \cos \theta_{i1}$ \hfill (10c)

$$T_2 - T_1 \approx (T_2 - T_1)\left(1 - \frac{V_B \cos \theta_{i_1}}{c}\right) \quad (11)$$

So there is a time shift occurring at the receiver dependent upon the receiver velocity and the relative angle between the transmitter and receiver. To get some idea of this time shift, let the emitter be transmitting a stable (constant rate) pulse train where the time of transmission difference between any two pulses is one msec. After 1001 pulses, the time difference between pulse number 1001 and the first pulse will be one second, and if there was no relative velocity between the transmitter and receiver the time difference of arrival at the receiver would also be one second. Now assume B is moving directly toward A with a constant (over the measurement time) velocity of 332 meters/sec (mach 1). The results of this calculation are shown in equation (12).

$$T_{1001} - T_1 = [1000 \times 10^{-3}] - \frac{[(322 \times 1000 \times 10^{-3})]}{3 \times 10^8} \quad (12)$$

$$T_{1001} - T_1 = [1] - 1.107 \times 10^{-6}$$

or there has been a 1.107 µsec shift in the received pulses relative to no movement or relative to the receiver flying normal to the emitter (i.e., $\theta_i = 90$ degrees). Also, note that the measurable shift is a function of the look time and the velocity of the aircraft.

Time Doppler Exploitation: As can be seen from the previous equations, the measured time shift is a function of the velocity of the aircraft and the angle of aircraft relative to the emitter. If the actual time $T_n - T_1$ were known and the velocity of the aircraft were known, then the angle to the emitter could be calculated and refined with additional measurements. The velocity of the aircraft can be measured from a navigation system, which may be the aircraft's inertial navigation system or Global Position System calculations. What is not well defined however, are the actual time of transmissions. Typically what is known is general information about the emitter, such as with a time difference of transmission between pulses of approximately x microseconds or it is a two position stagger with time sequences being approximately y microseconds followed by approximately z microseconds, etc. By applying such a priori knowledge as a normalization factor the time $T_n - T_1$ can be approximated and used.

Figure 6:
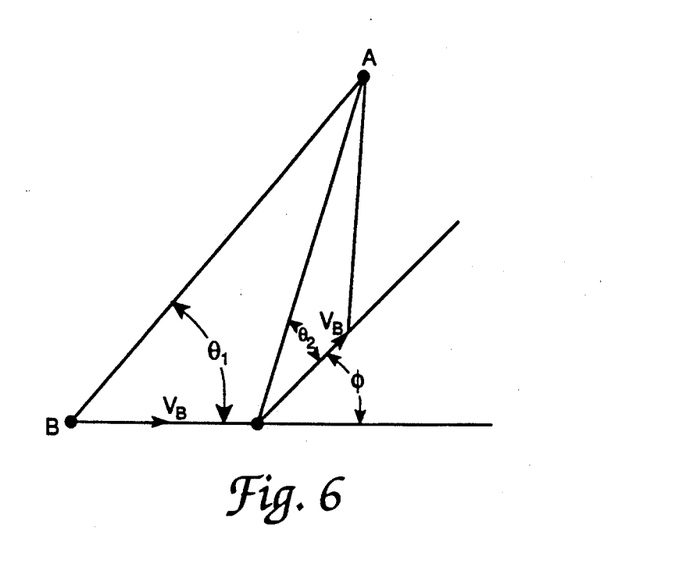
FIG. 6 is a diagram showing an angle estimation geometry.

Angle Approximation Technique (FIG. 6): Assume the general approximation equation of $T_n' - T_1'$ could be normalized via a priori information in some manner such that for any K samples that equation (13) applies.

$$e_K = R(1 - s \cos \theta_K) \quad (13)$$

In equation (13), $e_K$ is a measurable quantity, s is a measurable quantity and constant and R is of unknown value but is constant over any K sample, and $\theta_K$ is unknown. Also, assume that two samples of e are made using two different angles $\theta_1$, $\theta_2$ where $\theta_1 = \theta_2 - \phi$ and $\phi$ is known, then equation (13) can be rewritten as equation (14):

$$R = \frac{e_K}{(1 - s \cos \theta_K)} \quad (14)$$

and for the two samples equation (15) results.

$$R = \frac{e_1}{(1 - s \cos \theta_1)} \text{ and } R = \frac{e_2}{(1 - s \cos \theta_2)} \quad (15)$$

One normalization technique for a stable emitter would be to require the receiver to collect the same number of pulses on each k. In this case equation (16) would result.

$$e = \frac{T_n - T_1}{n - 1} \text{ and } R = \frac{T_n - T_1}{n - 1} \quad (16)$$

Equation (16) may be considered as a definition of the quantities e and R. Recall that T is the time of transmittal of pulses at the emitter at point A, and T' is the time that the pulses are received at the aircraft at point B. The quantity s is defined as $$s = \frac{V_B}{c(n - 1)}$$

where $V_B$ is the aircraft velocity and c is the speed of light. Obviously for s to remain constant the aircraft velocity $V_B$ must remain constant. The turning angle $\phi$ of the aircraft can be measured from a navigation system, which may be the aircraft's inertial navigation system or Global Position System calculations. Setting R's equal in equation (15) and solving for $e_2 - e_1$ results in equation (17).

$$e_2 - e_1 = (e_2 s \cos(\phi) - e_1 s) \cos(\theta_2) + e_2 s \sin(\phi) \sin(\theta_2) \quad (17)$$

The above equation is in the form shown in equation (18) (Reference, "Table of Integrals and Other Mathematical Data", Herbert Dwight, page 79, equation 401.2).

$$p \cos \theta_2 + q \sin \theta_2 = r \sin (\theta_2 + \lambda) \quad (18)$$
where
$$r = (p^2 + q^2)^{\frac{1}{2}}$$

$$\sin \lambda = \frac{p}{r}$$

Then using equation (18), equation (17) and solving for $e_2 - e_1$ results in equation (19).

$$e_2 - e_1 = s[e_2^2 - 2e_1 e_2 \cos\phi + e_1^2]^{\frac{1}{2}} \sin\left(\theta_2 + \left(\arcsin\frac{p}{r}\right)\right) \quad (19)$$

where $$\frac{p}{r} = \frac{e_2 \cos\phi - e_1}{(e_2^2 - 2e_1 e_2 \cos\phi + e_1^2)^{\frac{1}{2}}}.$$

Equation (19) can readily be solved for $\theta_2$. Once $\theta_2$ is approximated R can be calculated from equation (20).

$$R = \frac{e_2}{(1 - s \cos \theta_2)} \text{ and } R = \frac{e_1}{(1 - s \cos \theta_1)} \quad (20)$$

While the above equation was generated by assuming both $e_1$ and $e_2$ were measured from the same point, the approximation is close when the measurements are made on two different legs if the distance from the emitter is large and the measurements are made rather quickly. This situation is shown in FIG. 6.

Figure 6A:
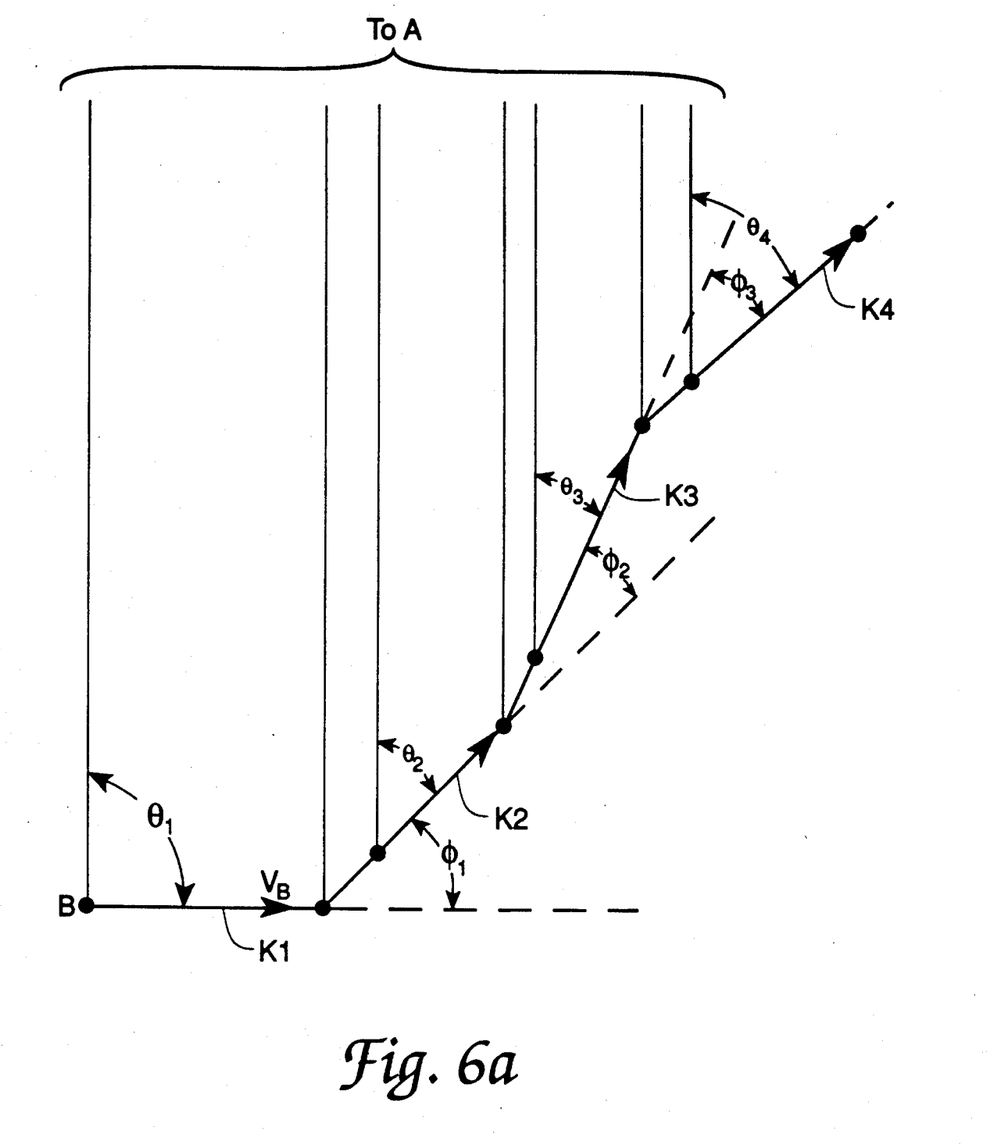
FIG. 6a is a diagram showing an angle estimation geometry over a plurality of legs.

Iteration over several legs (FIG. 6a): The diagram of FIG. 6a shows the extension of the situation of FIG. 6 over a plurality of legs. The aircraft may fly along a first leg K1, make a turn and fly along a second leg K2, make another turn and fly along a third leg K3, and so on. The angle $\phi$ may have a positive or negative value, depending on the direction of a turn. The calculations are based on the assumption that the lines from points along the flight path to the emitter at point A are all substantially parallel. For example, if the aircraft were to fly along each leg for one second at mach 1, each leg would be 332 meters long, while the distance to the emitter may be of the order of 100 to 200 kilometers.

For an initial calculation of a value for R, the angles $\theta_1$, $\theta_2$ and $\phi_1$ are used. A second iteration for calculating the value of R uses the angles $\theta_2$, $\theta_3$ and $\phi_2$ for the second leg K2. The iterations would continue with respect to successive legs until the value is substantially constant from one iteration to the next, which might be about six legs. The value of R is then used as a constant to determine the angle of arrival of pulses from the emitter at point A.

Conclusion

In conclusion, one method of measuring angles of arrival assumes that the general approximation equation of $T_n' - T_1'$ is normalized such that for any K samples that equation (13) applies.

$$e_K = R(1 - s \cos \theta_K)$$

The method of measuring angles of arrival $\theta_K$ comprises the following steps. The aircraft is flown along a first leg K1 and the aircraft velocity $V_B$ is determined using the navigation system. While the aircraft is flying in a straight line along the leg K1, a sample is taken by measuring a train of pulses 1 to n inclusive to determine the time interval $T'_n - T'_1$. The quantity s is calculated as $$s = \frac{V_B}{c(n-1)}$$

where $V_B$ is the aircraft velocity and c is the speed of light. The value of $e_1$ is calculated as $$e_1 = \frac{T_n - T_1}{n - 1}$$

The aircraft then executes a turn until it is flying in a straight path along leg K2. The angle $\phi_1$ between legs K1 and K2 is determined using the navigation system. While the aircraft is flying in a straight line along the leg K2 at the same velocity $V_B$, another sample is taken by measuring a train of pulses 1 to n inclusive to determine a new time interval $T'_n - T'_1$ (note that the same value of n is used for all samples). The value of $e_2$ is calculated as $$e_2 = \frac{T_n - T_1}{n - 1} \text{ (leg K2)}$$

The value of $\theta_2$ is then calculated using equation (19), with the value of $\phi_1$ for $\phi$.

$$e_2 - e_1 = s[e_2{}^2 - 2e_1 e_2 \cos\phi + e_1{}^2]^{\frac{1}{2}} \sin\left(\theta_2 + \left(\arcsin\frac{p}{r}\right)\right)$$

where
p = $-e_1 + e_2 \cos\phi$
r = $(e_2{}^2 - 2e_1 e_2 \cos\phi + e_2{}^2)^{\frac{1}{2}}$ An initial value for R can now be calculated using equation (20).

$$R = \frac{e_2}{(1 - s \cos \theta_2)} \text{ and } R \frac{e_1}{(1 - s \cos \theta_1)}$$

The aircraft then executes another turn until it is flying in a straight path along leg K3. The angle $\phi_2$ between legs K2 and K3 is determined using the navigation system. While the aircraft is flying in a straight line along the leg K3 at the same velocity $V_B$, another sample is taken by measuring a train of pulses 1 to n inclusive to determine a new time interval $T'_n - T'_1$. The value of $e_3$ is calculated as $$e_3 = \frac{T_n - T_1}{n - 1} \text{ (leg K3)}$$

The value of $\theta_3$ is then calculated using equation (19) the value of $\phi_2$ for $\phi$.

$$e_3 - e_2 = s[e_3{}^2 - 2e_2 e_3 \cos\phi + e_2{}^2]^{\frac{1}{2}} \sin\left(\theta_3 + \left(\arcsin\frac{p}{r}\right)\right)$$

where
p = $-e_2 + e_3 \cos\phi$
r = $(e_3{}^2 - 2e_2 e_3 \cos\phi + e_3{}^2)^{\frac{1}{2}}$ Another value for R can now be calculated using equation (20).

$$R = \frac{e_3}{(1 - s \cos \theta_3)}$$

The iteration then continues repeating the above steps along successive legs K4, etc. until the value of R is refined to the point that it remains substantially constant from leg to leg. The value of the angle of arrival $\theta_K$ can then be calculated each time a sample of n pulses is measured. Note that a plurality of samples may be measured on each leg, and averaged for the time interval of the received pulses.

Error Affects (FIG. 6): Up to this point the affects of transmission and measurement errors have been ignored. The following discussion addresses two types of potential errors. 1) Transmission jitter and 2) measurement quantization.

The basic time of transmission error (commonly called jitter) can primarily be traced back to the transmitter not emitting a pulse exactly when directed to do so. Jitter is a function of the internal mechanics and design of the transmitter and varies for the various classes of transmitters and even among transmitter of the same class. Jitter is usually considered as ranging randomly between 0 and some maximum value. Jitter affects can easily be incorporated into the previous equations by changing the time of transmissions from $T_0$ to $T_0+j_0$ where $0 \leq j_0 \leq j_{max}$. Then for the last case considered:

Equating equation (21), solving for $T_2'-T_1'$ yields equation (22).

$$T_1 = T_1 + j_1 + \frac{d_{i1}}{(c + V_B \cos \theta_{i1})}, \quad 0 \leq j_1 \leq j_{max} \quad (21)$$

$$T_2 = T_2 + j_2 + \frac{d_{i1}}{(c + V_B \cos \theta_{i2})}, \quad 0 \leq j_2 \leq j_{max}$$

$$T_2 - T_1 = [(T_2 - T_1) + (j_2 - j_1)] \left[1 - \frac{V_B \cos \theta_{i1}}{c}\right] \quad (22)$$

or $$T_2 - T_1 = [(T_2 - T_1) \pm j] \left[1 - \frac{V_B \cos \theta_{i1}}{c}\right],$$
$$0 \leq j \leq j_{max}$$

For a small j the above equation can be approximated as shown in equation (23).

$$T_2 - T_1 \approx (T_2 - T_1)\left(1 - \frac{V_B \cos \theta_{i1}}{c}\right) \pm J, \quad (23)$$
$$0 \leq J \leq j_{max}$$

where $$J \approx j\left(1 - \frac{V_B \cos \theta_{i1}}{c}\right)$$

Receiver time quantization error is a direct result of the measurement scheme of the receiver which in essence overlaps a continuous running clock of some period p with the detected incoming pulse. Typically a time measurement is recorded when an edge of a clock becomes active and a pulse has been detected. The time of arrival recorded then becomes the actual time of arrival $t_0'$ plus a random value of less than one clock period, or in the previous equation $T_0'$ is replaced by $T_0' + \epsilon_0$ where $\epsilon_0$ is a random number and $0 \leq \epsilon_0 \leq p$. In this case the previous equation becomes equation (24).

$$T_2 + \epsilon_2 - T_1 - \epsilon_1 = (T_2 - T_1)\left(1 - \frac{V_B \cos \theta_{i1}}{c}\right) \pm J. \quad (24)$$

or $$T_2 - T_1 \approx (T_2 - T_1)\left(1 - \frac{V_B \cos \theta_{i1}}{c}\right) \pm J \pm \epsilon$$

Some observations can now be made concerning the capability of our angle measurement scheme. First of all, the error affects of both jitter and quantization will become less as a longer time interval is measured or it may be possible to mitigate the affects by taking several short snap shots and averaging the result. Secondly, we typically have no control over the transmission jitter but on new systems random jitter is minimized. Thirdly, we do have control over our own measurement accuracy and reasonable state-of-the-art in this measurement can easily be less than 3 nsec which also minimizes this effect.

Experimental Results: To test this invention a simulation was generated in which a receiver is flown in an environment consisting of one transmitter located approximately 140 km away initially. The receiver has some initial flight path which is randomly selected. Initially a collection of radar pulses is made and the receiver then jinked (defined as a change in angle in a short period of time) and another collection made. Jinks are randomly selected but not less than 10 degrees or larger than 45 degrees. During the jink time, data is not collected. The aircraft is flying at a constant velocity of mach 1 and the turn rate used is 5 degrees/sec. Each collection is made over a 5 sec period. Where data is collected for about 250 msec each sec and an average (over the 5 sec), collection value is used in each leg. A total of 5 jinks are collected and the angle and R value calculated on each jink. The R values for all jinks are averaged and this is used throughout the rest of the simulation to measure angle.

Figure 7:
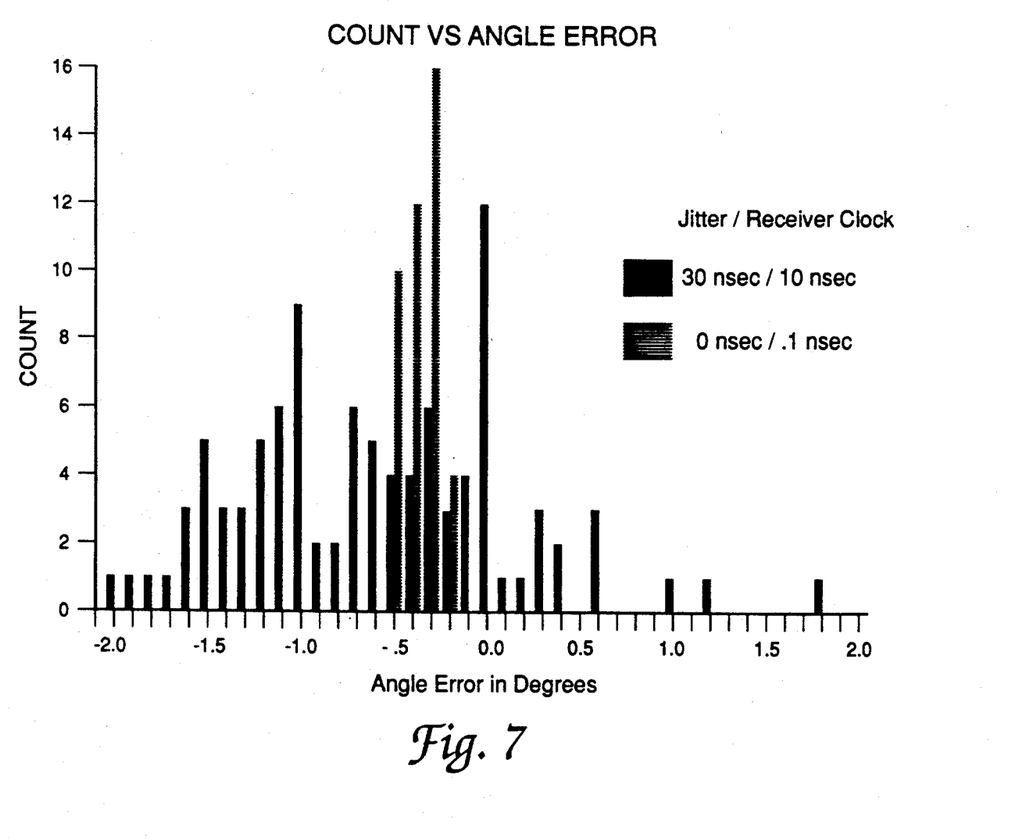
FIG. 7 is a bar graph showing count versus angle error.

The results of several runs are shown in FIG. 7. These are error counts on the y axis, and angle error value on the x axis. In one case, the transmitter has zero jitter and the receiver clock is 0.1 nanoseconds. As can be seen a total of 40 angle measurements were made (2 simulation runs) and the angle error ranged from 0.3 to 0.5 degrees. In the other, the emitter had 30 nanoseconds of jitter and the receiver clock period was 10 nanoseconds. In this FIG. 80 angle measurements were made (4 simulated runs) and the error was primarily centered around $-1° \pm 1°$.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A method of measuring the angle of arrival (AOA) of radar pulses from a ground-based emitter via doppler shift, using apparatus including a pulse collection radar receiver, navigation means and computing means deployed on a high performance aircraft;
   wherein the aircraft is flown at a constant velocity $V_B$ along successive legs with an angle $\phi_K$ between successive legs, wherein the method includes determining the velocity $V_B$ and the angles $\phi_K$ using the navigation means, using the radar receiver for receiving samples of radar pulses from said emitter, with each sample comprising n pulses, n being constant for all samples, and measuring the time difference $T_n'-T_1'$ between the arrival of the first and last of the n pulses for each sample;
   assuming that a general approximation equation of $T_n'-T_1'$ is normalized such that for any K samples the following equation applies, $$e_K = R(1 - s \cos \theta_K)$$

wherein $\theta_K$ is the angle from the line of flight for a leg K to the emitter, and $e_K$ and s are defined as $$e_K = \frac{T_n - T_1}{n - 1} \text{ (for a leg } K\text{)}$$

$$s = \frac{V_B}{c(n-1)}$$

where c is the velocity of light; wherein the method of measuring angles of arrival $\theta_K$ comprises the steps:

a) while the aircraft is flown in a straight line along a first leg K1 and the aircraft velocity $V_B$ is determined using the navigation means, measuring a train of pulses 1 to n inclusive to determine the time interval $T'_n - T'_1$ for that sample, calculating the value of $e_1$ as $$e_1 = \frac{T_n - T_1}{n - 1} \text{ (leg } K1\text{)}$$

b) after the aircraft then executes a turn until it is flying in a straight path along leg K2, and the angle $\phi_1$ between legs K1 and K2 is determined using the navigation means, taking another sample by measuring a train of pulses 1 to n inclusive to determine a new time interval $T'_n - T'_1$, calculating the value of $e_2$ as $$e_2 = \frac{T_n - T_1}{n - 1} \text{ (leg } K2\text{)}$$

c) calculating a value of $\theta_2$ using the following equation with the value of $\phi_1$ for $\phi$.

$$e_2 - e_1 = s [e_2{}^2 - 2e_1 e_2 \cos\phi + e_1{}^2]^{\frac{1}{2}} \sin\left(\theta_2 + \left(\arcsin\frac{p}{r}\right)\right)$$

where
$p = -e_1 + e_2 \cos\phi$
$r = (e_2{}^2 - 2e_1 e_2 \cos\phi + e_2{}^2)^{\frac{1}{2}}$, d) calculating an initial value for R using the following equation, $$R = \frac{e_2}{(1 - s\cos\theta_2)}$$

e) after the aircraft then executes a turn until it is flying in a straight path along a leg K3, and the angle $\phi_2$ between legs K2 and K3 is determined using the navigation means, taking another sample by measuring a train of pulses 1 to n inclusive to determine a new time interval $T'_n - T'_1$, calculating the value of $e_3$ as $$e_3 = \frac{T_n - T_1}{n - 1} \text{ (leg } K3\text{)}$$

f) calculating a value of $\theta_3$ using the following equation, with the value of $\phi_2$ for $\phi$:

$$e_3 - e_2 = s [e_3{}^2 - 2e_2 e_3 \cos\phi + e_2{}^2]^{\frac{1}{2}} \sin\left(\theta_2 + \left(\arcsin\frac{p}{r}\right)\right)$$

where
$p = -e_2 + e_3 \cos\phi$
$r = (e_3{}^2 - 2e_2 e_3 \cos\phi + e_3{}^2)^{\frac{1}{2}}$, g) calculating another value for R using the equation $$R = \frac{e_3}{(1 - s\cos\theta_3)}$$

h) continuing the iteration repeating the above steps (e), (f) and (g) along successive legs until the value of R is refined to the point that it remains substantially constant from leg to leg, and calculating a value of the angle of arrival $\theta_K$ on any leg.

* * * * *

UNITED STATES PATENT AND TRADEMARK OFFICE
CERTIFICATE OF CORRECTION

PATENT NO. : 5,241,313
DATED : August 31, 1993
INVENTOR(S) : Rudy L. Shaw et al

It is certified that error appears in the above-identified patent and that said Letters Patent is hereby corrected as shown below:

On the Title Page, Item [57]
Abstract, Equation 1, "$\phi$" should be --- $\theta$ ---.

Column 1, line 20, "aircfaft" should be ---aircraft---.

Column 4, line 30, "(7)" should appear to the right of the third equation.

Column 5, line 47, ---it is a stable emitter--- should appear after "as".

Column 6, line 12, "k" should be ---look---.

Column 9, line 46, "$t_0\,'''$" should be ---$T_0\,'$---.

Signed and Sealed this

Tenth Day of May, 1994

Attest:

BRUCE LEHMAN

Attesting Officer     Commissioner of Patents and Trademarks